(12) United States Patent
Kobierecki et al.

(10) Patent No.: US 11,649,034 B2
(45) Date of Patent: May 16, 2023

(54) FLIGHT CONTROL SURFACE FOR AN AIRCRAFT AND METHOD FOR MANUFACTURING SAID FLIGHT CONTROL SURFACE

(71) Applicant: Airbus Operations, S.L., Getafe (ES)

(72) Inventors: Robert Kobierecki, Getafe (ES); Miguel Ángel Mendez Rodríguez, Getafe (ES); Juan Antonio Sánchez Ruiz, Getafe (ES); Alberto Balsa-Gonzalez, Getafe (ES)

(73) Assignee: Airbus Operations S.L., Getafe (ES)

( * ) Notice: Subject to any disclaimer, the term of this patent is extended or adjusted under 35 U.S.C. 154(b) by 429 days.

(21) Appl. No.: 16/744,342

(22) Filed: Jan. 16, 2020

(65) Prior Publication Data

US 2020/0231270 A1     Jul. 23, 2020

(30) Foreign Application Priority Data

Jan. 18, 2019 (EP) .................................. 19382036

(51) Int. Cl.
*B64C 3/26* (2006.01)
*B29C 65/60* (2006.01)
(Continued)

(52) U.S. Cl.
CPC ................ *B64C 3/26* (2013.01); *B29C 65/60* (2013.01); *B64C 9/00* (2013.01); *B29L 2031/3076* (2013.01)

(58) Field of Classification Search
CPC .... B64C 9/00; B64C 9/02; B64C 3/20; B64C 3/26; B64C 3/28; B29C 65/60
See application file for complete search history.

(56) References Cited

U.S. PATENT DOCUMENTS 3,814,540 A * 6/1974 Schramm .............. B64C 27/473
                                              416/144
4,667,906 A * 5/1987 Suarez ..................... B64C 3/28
                                              D12/345
(Continued)

FOREIGN PATENT DOCUMENTS

| EP | 3210883 A1 | 8/2017 |
|---|---|---|
| EP | 3243742 A1 | 11/2017 |
| EP | 3360778 A1 | 8/2018 |

OTHER PUBLICATIONS

European Search Report; priority document.

*Primary Examiner* — Michael H Wang
(74) *Attorney, Agent, or Firm* — Greer, Burns & Crain, Ltd.

(57) ABSTRACT

A flight control surface comprising a main body comprising an upper and lower cover, upper and lower skins and a core member, a prolongation of their length over the length of the core member defining a stepped area. A trailing edge of the control surface comprises a U-shaped profile enclosing the prolongation, the U-shaped profile extending towards the main body in the chordwise direction up to the stepped area and comprising a section that progressively decreases. The trailing edge comprises a first and a second set of rivets located in the prolongation, the first set of rivets joining the upper and lower covers and the second set of rivets joining the U-shaped profile, the upper covers and the lower covers.

4 Claims, 4 Drawing Sheets

(51) Int. Cl.
*B64C 9/00* (2006.01)
*B29L 31/30* (2006.01)

(56) References Cited

U.S. PATENT DOCUMENTS

| | | |
|---|---|---|
| 10,815,002 B2 * | 10/2020 | Ding .................... B64C 3/28 |
| 11,312,507 B2 * | 4/2022 | Cheng ................... B64C 1/12 |
| 2004/0000613 A1 * | 1/2004 | Thomas, Jr. ............. B64C 3/28 244/10 |
| 2010/0155528 A1 * | 6/2010 | Balsa Gonzalez ........ B64C 9/00 244/123.1 |
| 2014/0339370 A1 * | 11/2014 | De Gregorio Hurtado ................ B64C 3/20 244/35 R |
| 2015/0129714 A1 * | 5/2015 | Wei ..................... B64C 3/28 244/99.2 |
| 2017/0246833 A1 | 8/2017 | Crespo Pena et al. |
| 2017/0283034 A1 | 10/2017 | Balzer et al. |
| 2017/0327245 A1 | 11/2017 | Salisbury |
| 2017/0341774 A1 * | 11/2017 | Ding .................... B64C 3/20 |
| 2018/0222571 A1 * | 8/2018 | Santini ................. B64C 9/02 |

* cited by examiner

FLIGHT CONTROL SURFACE FOR AN AIRCRAFT AND METHOD FOR MANUFACTURING SAID FLIGHT CONTROL SURFACE

CROSS-REFERENCES TO RELATED APPLICATIONS

This application claims the benefit of the European patent application No. 19382036.2 filed on Jan. 18, 2018, the entire disclosures of which are incorporated herein by way of reference.

FIELD OF THE INVENTION

The invention relates to a flight control surface of an aircraft and also to a method for manufacturing the flight control surface.

BACKGROUND OF THE INVENTION

Known control surfaces of an aircraft comprise an upper cover and a lower cover wherein each cover comprises a sandwich carbon fiber structure having upper and lower skins and a core member located between the upper and lower skins. Additionally, the skins comprise a prolongation of their length over the length of the core member in the chordwise direction of the control surface therefore generating a step in the trailing edge area due to the non-existence of the core at the edge of the control surface. This step has a strong influence on the drag created by the aerodynamic surface.

To avoid aerodynamic drag penalty, epoxy filler is applied to smooth the afore mentioned step. The application of the filler is time consuming and also increases the weight of the flight control surface. Additionally, this filler is sensitive to being cracked in service leading to subsequent cracking and flacking of the external surface paint scheme which may further lead to customer concerns because of its deteriorated appearance and repaint costs.

Document EP3210883 discloses another solution based on U-shaped metallic clips, joining upper and lower covers with one or two rows of fasteners that leads to a use of countersunk rivets to avoid drag penalty that increases costs of maintenance operations when these profiles have to be replaced due to lightning strikes or accidental damage. The U-shaped profiles extend in the chordwise direction up to the stepped area and comprise a cross section in a plane in the chordwise direction that progressively decreases towards the end part of the U-shaped profile opposite to the main body. Additionally, for performing the countersinking of the rivets, a filler needs to be located in between the U-shaped metallic profile, thus increasing weight and manufacturing time.

SUMMARY OF THE INVENTION

The claimed invention is directed to a flight control surface for an aircraft comprising:
a main body comprising an upper cover and lower cover, each cover comprising upper and lower skins and a core member located between the upper and lower skins of each cover, the skins of the covers comprising a prolongation of their length over the length of the core member in the chordwise direction of the control surface such that the upper cover and the lower cover define a stepped area, and
a trailing edge annexed to the main body in the chordwise direction of the control surface, the trailing edge comprising a U-shaped profile enclosing the prolongation of the main body, the U-shaped profile having an internal and an external surface, the internal surface facing the prolongation,
the U-shaped profile extending towards the main body in the chordwise direction up to the stepped area and comprising a cross section in the chordwise direction that progressively decreases towards the end part of the U-shaped profile opposite to the main body.

The trailing edge of the flight control surface further comprises a first and a second set of rivets located in the prolongation, each rivet comprising a pin and at least one head, wherein the at least one head of the first set of rivets is located between the cover and the U-shaped profile to join the upper and lower covers together and wherein the at least one head of the second set of rivets is located at the external surface of the U-shaped profile to join the U-shaped profile and the upper and lower covers together.

According to the above, the claimed invention allows the suppression of the aerodynamic filler described in the state of the art by covering the whole trailing edge gap with a U-shaped profile with a decreasing section, usually made from aluminum. The decreasing section also avoids the need of a filler located in between the U-shaped profile for performing the stamping tasks of the rivets.

It is clear therefore that the claimed invention has the advantage that it avoids the time of application of the filler and also the subsequent curing time, both during manufacturing and maintenance.

Finally, as the U-shaped profile progressively decreases towards its end, it achieves a desired aerodynamic profile removing drag penalty. The invention provides an optimum aerodynamic performance due to gaps removal in the aerodynamic profile, minimizing air disturbances in skin—profile transition.

An additional advantage is that if the U-shaped profile is made from aluminum, as the aluminum profile is a resistant element it does not easily crack in service therefore increasing customer satisfaction. Additionally, the claimed invention maintains electrical continuity to protect the aircraft against lightning strikes.

The claimed invention saves weight relative to the state of the art because it is not necessary to fill gap between profile and skins to join these three parts.

According to the claimed invention, the trailing edge comprises a first and a second set of rivets, the first set of rivets joining the upper and lower covers directly and the second set of rivets joining the U-shaped profile to the upper and lower covers by stamping the second set of rivets that are located every "x" rivets. Thus, only the "x" rivets need to be uninstalled to remove the U-shaped profile. In the state of art, several maintenance operations are frequently needed due to impacts in trailing edge aluminum profiles. To replace these U-shaped profiles, hundreds of rivets should be uninstalled. Hence, the present invention considerably reduces the quantity of rivets to uninstall.

It is also an object of the invention to provide an aircraft comprising a control surface and the method for manufacturing the mentioned control surface that comprises the following steps:
providing a flight control surface comprising:
a main body comprising an upper cover and lower cover, each cover comprising upper and lower skins and a core member located between the upper and lower skins of each cover, the skins of the covers comprising a prolongation of their length over the length of the core member in the chordwise direction of the control surface such that the upper cover and the lower cover define a stepped area, and a trailing edge annexed to the main body in the chordwise direction of the control surface comprising a U-shaped profile enclosing the prolongation of the main body, the U-shaped profile having an internal and an external surface, the internal surface facing the prolongation, providing a U-shaped profile enclosing the prolongation of the main body, the U-shaped profile comprising a cross section in the chordwise direction that progressively decreases towards the end part of the U-shaped profile opposite to the main body, providing first and second set of rivets in the prolongation of the main body, each rivet comprising a pin and a at least one head, stamping the first set of the rivets joining the upper and lower covers, locating the U-shaped profile in the chordwise direction so that it extends up to the stepped area and such that the at least one head of the first set of rivets are located between the covers and the U-shaped profile, and stamping the second set of rivets such that the at least one head of the second set of rivets is located at the external surface of the U-shaped profile to join the U-shaped profile and the upper and lower covers together.

BRIEF DESCRIPTION OF THE DRAWINGS

To complete the description and in order to offer a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
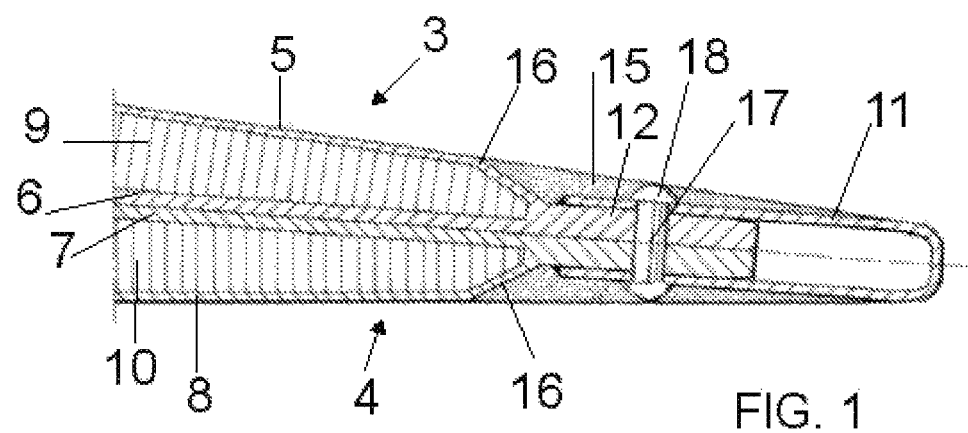
FIG. 1 shows a cross section of a control surface and a corresponding trailing edge according to the state of the art.

FIG. 1 discloses a control surface according to the state of the art in which the main body (1) is depicted comprising an upper cover (3) and a lower cover (4), each cover (3, 4) comprising upper and lower skins (5, 6, 7, 8) and a core member (9, 10) located between the upper and lower skins (5, 6, 7, 8) of each cover (3, 4).

Additionally, the skins (5, 6, 7, 8) of the covers (3, 4) comprise a prolongation (12) of their length over the length of the core member (9, 10) in the chordwise direction of the control surface. This prolongation (12) defines a stepped area (16) between the area of the main body (1) in which the core member (9, 10) is present and the prolongation (12) itself wherein the core member (9, 10) is missing.

FIG. 1 discloses a U-shaped profile (11) that encloses the prolongation (12) of the main body (1) and a filler material (15) filling the gap between the stepped area (16) and the U-shaped profile (11) such that a smooth transition is performed. Another possibility known in the state of the art would be having a U-shaped profile with a decreasing section and filler located in between the U-shaped profile.

Figure 2:
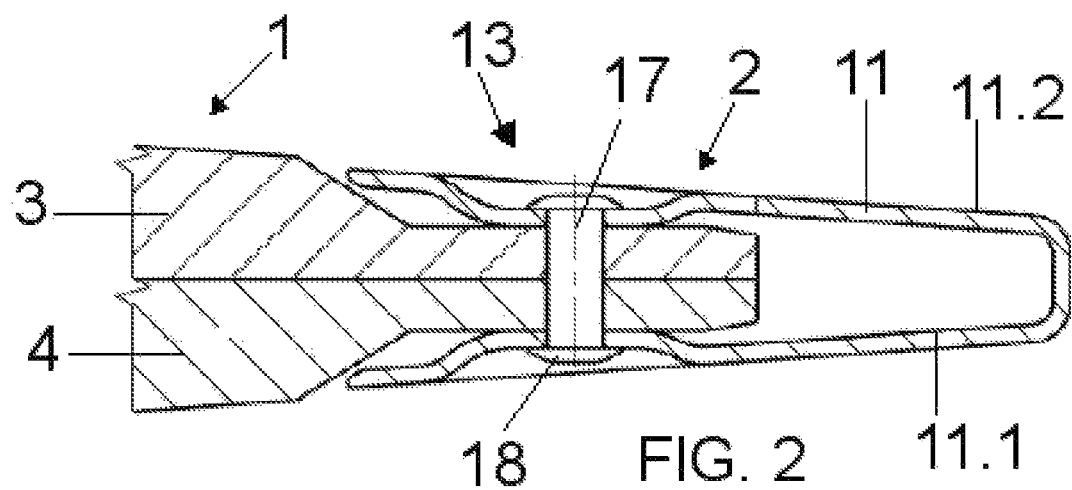
FIG. 2 shows a cross section of an embodiment of the control surface of the invention and its trailing edge showing a rivet that joins the U-shaped profile and two covers.
Figure 3:
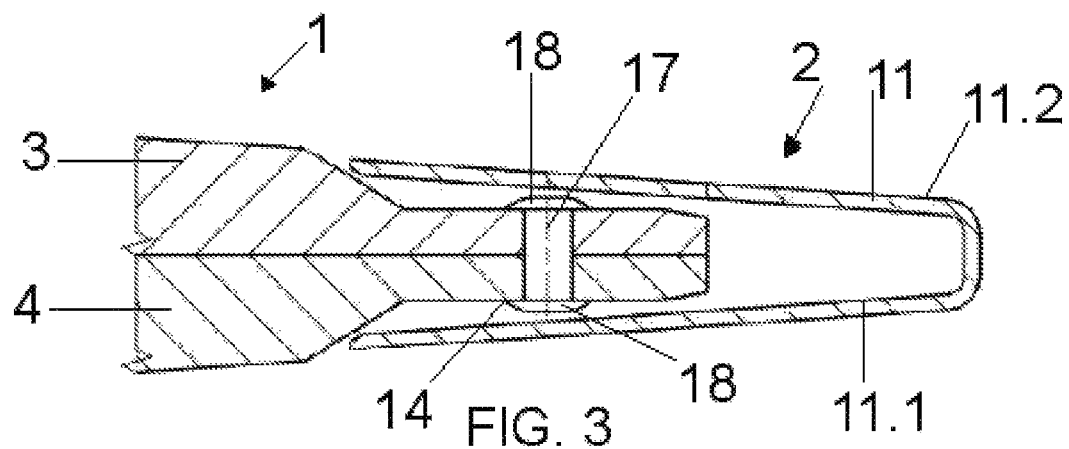
FIG. 3 shows a cross section of an embodiment of the control surface of the invention and its trailing edge showing a rivet that joins the two covers but not the U-shaped profile.
Figure 4:
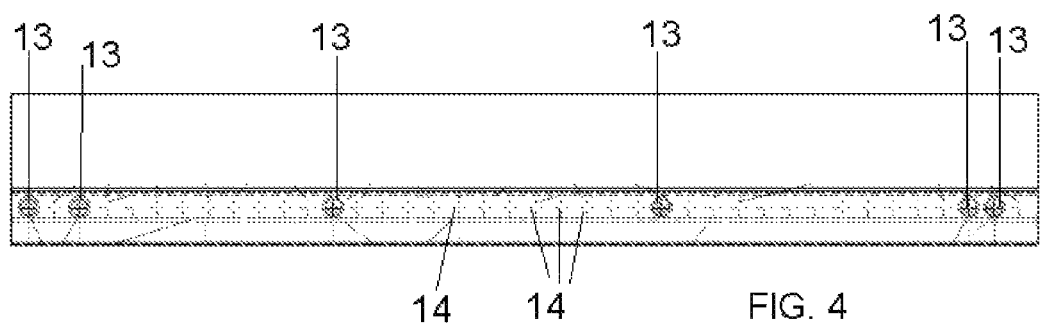
FIG. 4 shows a schematic plan view of an embodiment of the trailing edge of the flight control surface of the invention.
Figure 5:
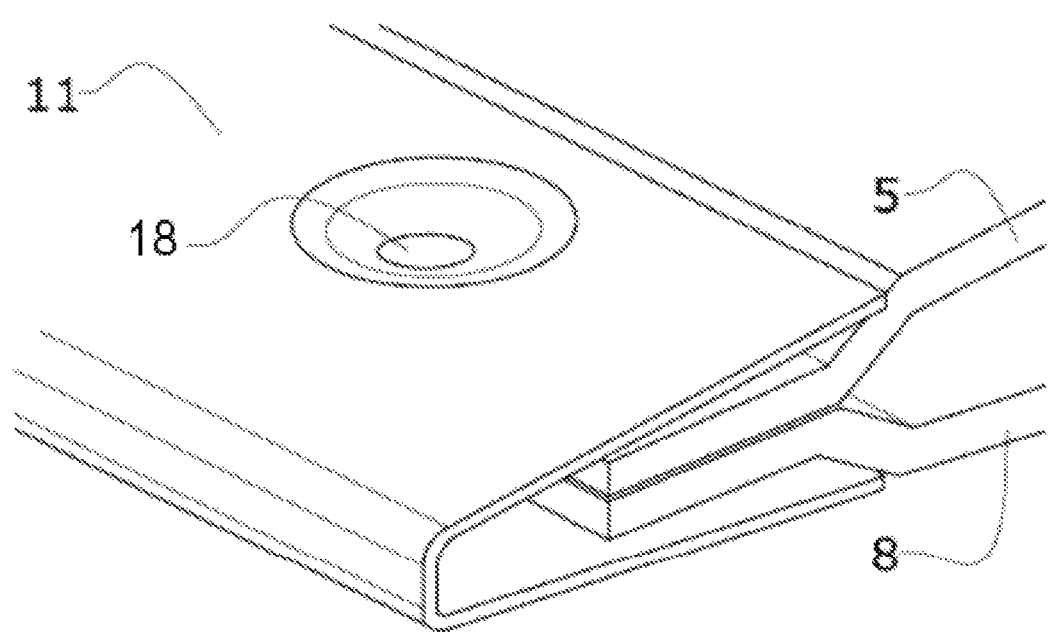
FIG. 5 shows a perspective view of an embodiment of the trailing edge of the flight control surface of the invention.
Figure 6:
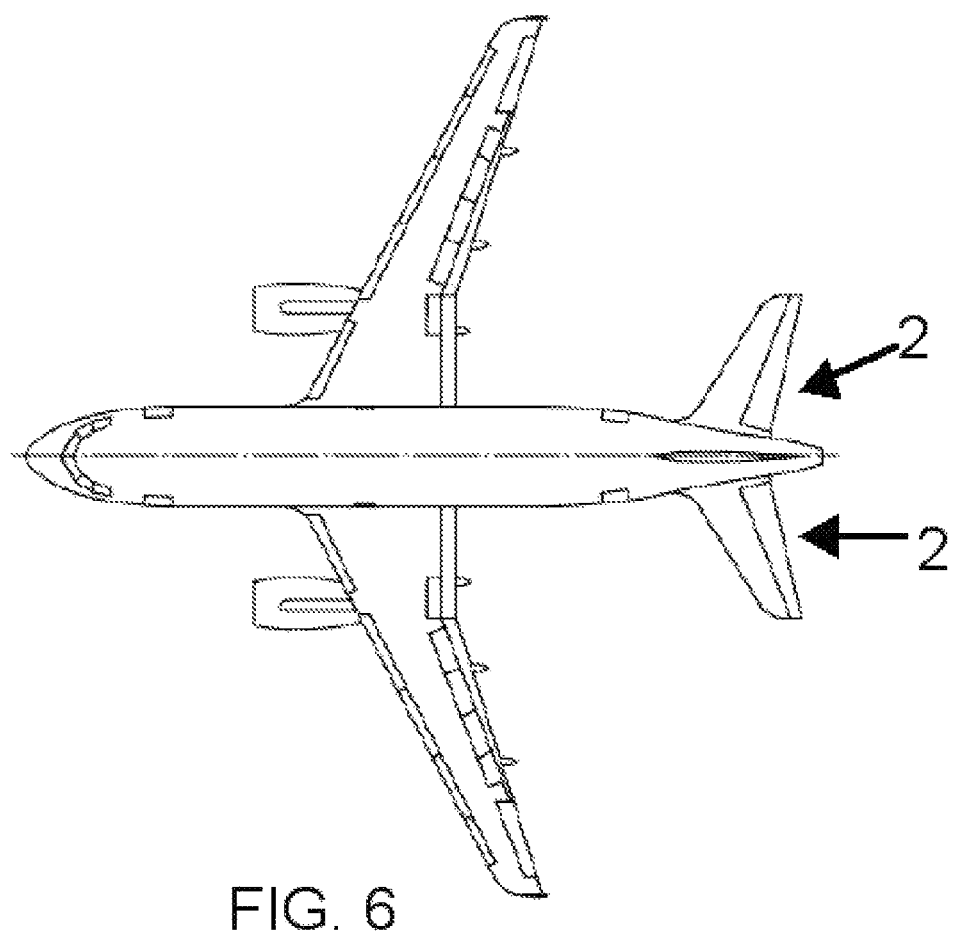
FIG. 6 shows an aircraft according to an embodiment of the invention.

FIGS. 2 and 3 disclose an embodiment of the invention, in which the U-shaped profile (11) extends up to the upper (5) and lower (8) skins in the stepped area (16) and comprises a cross section in a plane in the chordwise direction that progressively decreases towards the end part of the U-shaped profile opposite to the main body (1).

As stated, each rivet (13, 14) comprises a pin (17) and at least a head (18), more specifically, the embodiments disclosed in the figures show rivets (13, 14) comprising a pin (17) and two heads (18).

FIG. 2 discloses one of the second set of rivets (13) joining the U-shaped profile (11), the upper (3) and lower (4) covers wherein additionally, the U-shaped profile (11) is in contact, in the prolongation (2), with the skins (5, 6, 7, 8) of the upper and lower covers (3, 4) in the area surrounding the second set of rivets (13). The configuration also avoids the need of locating a filler between the U-shaped profile (11) to stamp the second set of rivets (13).

FIG. 3 discloses one of the first set of rivets (14) joining the upper (3) and lower (4) covers such that the heads (18) of the rivet (14) are located between the covers (3, 4) and the U-shaped profile (11).

Therefore, a set of rivets (13, 14) joins the U-shaped profile (11) and the two covers (3, 4). Some of the set of rivets, specifically a second set of rivets (13), join the U-shaped profile (11), the upper (3) and lower (4) covers and a first set of rivets (14) only join the upper (3) and lower (4) covers.

Additionally, the U-shaped profile (11) is respectively aligned with the upper (5) and lower (8) skins of the upper (3) and lower (4) covers of the main body (1) in a cross section in a plane in the chordwise direction, i.e., the U-shaped profile (11) is arranged so that it forms a straight line with the upper (5) and lower (8) skins of the main body (1) in the mentioned cross section so that there is a smooth aerodynamical transition between the skins (5, 8) and the U-shaped profile (11).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight control surface for an aircraft, comprising:
a main body comprising an upper cover and lower cover, each cover comprising upper and lower skins, and a core member located between the upper and lower skins of each cover,
the skins of the covers comprising a prolongation of their length over a length of the core member in a chordwise direction of the flight control surface such that the upper cover and the lower cover define a stepped area, and a trailing edge annexed to the main body in the chordwise direction of the control surface, the trailing edge comprising a U-shaped profile enclosing the prolongation of the main body, the U-shaped profile having an internal and an external surface, the internal surface facing the prolongation, the U-shaped profile extending towards the main body in the chordwise direction up to the stepped area and comprising a cross section in the chordwise direction that progressively decreases towards an end part of the U-shaped profile opposite to the main body, wherein the trailing edge comprises a first and a second set of rivets located in the prolongation, each rivet comprising a pin and at least one head, wherein the at least one head of the first set of rivets is located between the covers and the U-shaped profile to join the upper and lower covers together, and wherein the at least one head of the second set of rivets is located at the external surface of the U-shaped profile to join the U-shaped profile and the upper and lower covers together, wherein the U-shaped profile comprises a skin that is spaced apart from the skins of the upper and lower covers and further comprises a reduced cross section to contact with the skins of the upper and lower covers in the area surrounding the second set of rivets.

2. The flight control surface for an aircraft, according to claim 1, wherein the U-shaped profile is configured to be aligned with the upper skin of the upper cover and the lower skin of the lower cover of the main body in a cross section in the chordwise direction.

3. An aircraft, comprising a flight control surface according to claim 1.

4. A method for manufacturing a flight control surface for an aircraft, comprising the following steps:
providing the flight control surface comprising:
a main body comprising an upper cover and lower cover, each cover comprising upper and lower skins, and a core member located between the upper and lower skins of each cover, the skins of the covers comprising a prolongation of their length over the length of the core member in a chordwise direction of the control surface such that the upper cover and the lower cover define a stepped area, and a trailing edge annexed to the main body in the chordwise direction of the control surface, the trailing edge comprising a U-shaped profile enclosing the prolongation of the main body, the U-shaped profile having an internal and an external surface, the internal surface facing the prolongation, the U-shaped profile enclosing the prolongation of the main body, the U-shaped profile comprising a cross section in the chordwise direction that progressively decreases towards an end part of the U-shaped profile opposite to the main body, providing a first and second set of rivets in the prolongation of the main body, each rivet comprising a pin and at least one head, stamping the first set of the rivets joining the upper and lower covers, locating the U-shaped profile in the chordwise direction so that the profile extends up to the stepped area, and such that the at least one head of the first set of rivets is located between the covers and the U-shaped profile, and stamping the second set of rivets such that the at least one head of the second set of rivets is located at the external surface of the U-shaped profile joining the U-shaped profile and the upper and lower covers together, wherein the U-shaped profile comprises a skin that is spaced apart from the skins of the upper and lower covers and further comprises a reduced cross section to contact the skins of the upper and lower covers in the area surrounding the second set of rivets.

\* \* \* \* \*